(12) United States Patent
Henrion et al.

(10) Patent No.: US 7,080,071 B2
(45) Date of Patent: Jul. 18, 2006

(54) AUTOMATED DECISION ADVISOR

(75) Inventors: Max Henrion, Los Gatos, CA (US); Lonnie Chrisman, Los Gatos, CA (US); Zac Robinson, San Jose, CA (US)

(73) Assignee: Ask Jeeves, Inc., Oakland, CA (US)

( * ) Notice: Subject to any disclaimer, the term of this patent is extended or adjusted under 35 U.S.C. 154(b) by 0 days.

(21) Appl. No.: 09/923,772

(22) Filed: Aug. 6, 2001

(65) Prior Publication Data

US 2002/0077931 A1 Jun. 20, 2002

Related U.S. Application Data

(60) Provisional application No. 60/223,540, filed on Aug. 4, 2000.

(51) Int. Cl.
*G06F 17/30* (2006.01)

(52) U.S. Cl. .................... 707/6; 707/3; 707/2
(58) Field of Classification Search ................ 725/116; 707/3, 8
See application file for complete search history.

(56) References Cited

U.S. PATENT DOCUMENTS

| | | | |
|---|---|---|---|
| 5,754,938 A * | 5/1998 | Herz et al. ................. 725/116 |
| 6,012,053 A * | 1/2000 | Pant et al. ..................... 707/3 |
| 6,370,527 B1 * | 4/2002 | Singhal ......................... 707/6 |
| 6,377,944 B1 * | 4/2002 | Busey et al. ................... 707/3 |
| 6,510,406 B1 * | 1/2003 | Marchisio ...................... 704/9 |
| 6,829,603 B1 * | 12/2004 | Chai et al. ..................... 707/5 |
| 2001/0049688 A1 * | 12/2001 | Fratkina et al. .......... 707/104.1 |
| 2002/0082901 A1 * | 6/2002 | Dunning et al. .............. 705/10 |

* cited by examiner

*Primary Examiner*—Charles Rones
*Assistant Examiner*—Neveen Abel-Jalil
(74) *Attorney, Agent, or Firm*—Blakely, Sokoloff, Taylor & Zafman; Stephen M. Da Klerk

(57) ABSTRACT

The present invention provides an automated system to guide people ("users") to help them find and select products, services, or other items, that best meet their needs and preferences. The system obtains information from and about users to assess their needs and preferences. The system dynamically selects those questions to ask that are most likely to help discriminate between items based on information about user preferences and differences between the items, based on information about the user obtained so far. The system scores the available items in terms of how well they match user's needs and preferences and generates lists of recommended items. The system explains its recommendations using lists of pros and cons to help users understand how well the features or attributes of the items do or do not match their expressed needs.

25 Claims, No Drawings

AUTOMATED DECISION ADVISOR

CROSS-REFERENCES TO RELATED APPLICATIONS

Not Applicable

BACKGROUND OF THE INVENTION

1. Field of the Invention

The present invention relates to a system and method for finding and selecting products, services, or other items according to a set of target preferences.

2. Description of the Prior Art

The rapid expansion of the Internet and use of the World Wide Web has given rise to numerous tools to help people find what they are looking for. Search engines provide ways to help people find web pages with relevant information. Online stores often provide internal search and parametric search facilities to help customers find products with desired feature values. Unlike human sales staff in physical "brick-and-mortar" stores, few of these sites provide interactive personalized guidance to customers in selecting the products or services that will best meet their needs. Those interactive guides that exist do not provide personalized explanations of the advice so that users can understand the basis of recommendations. In recent years, the internet has exploded with numerous sites that provide information, sell products, and other services. Many websites have emerged to help "guide" users on the internet among the various websites. Many of these websites or "search engines" generally will help lead you to websites that contain information about subjects or items in which one is interested. Unfortunately, they generally do not organize, compare or rate different items within a subject. Thus, users may be forced to spend long hours "surfing" the web in order to gather information about different items.

Thus, there is a need for recommendations.

BRIEF SUMMARY OF THE INVENTION

The present invention provides an automated system to help and guide system users in finding and selecting products, services, or other selectable elements, that best meet their needs and preferences as expressed in a set of target preferences. The system obtains information from and about users to assess their needs and preferences and provides a list of items and information about those items based upon information provided by a user. The system prompts a user with regard to a type of item in which the user is interested. Based upon the answers provided by the user, the system scores the available items in terms of how well they match the user's needs and preferences and generates ranked lists of items and may even rank the item. The system dynamically selects those questions to ask that are most likely to help discriminate between items based on information about user preferences and differences between the items. The system provides a list of pros and cons to help users understand how well the features or attributes of the items do or do not match their needs.

One advantage of the present invention is that it need ask only those questions that are most likely to substantially affect the relative ranking of recommended items, and so reduces the effort required from the user in answering questions. Another advantage of the present invention is that it helps each user understand the reasons why items are ranked higher or lower in terms based on the information provided by that user so that the user can make an informed and confident choice among the items. A further advantage of the present invention is that it provides these reasons in a compact form mentioning only those reasons that are most relevant to each user so that users can understand the reasons with a minimum of effort.

Other features and advantages of the present invention will be understood upon reading and understanding the detailed description of the preferred embodiments below.

DETAILED DESCRIPTION OF THE INVENTION

The system in accordance with the present invention assists users in selecting items from a selected category in which the user is interested. A "category" generally refers to a class of products, services, or other items from which a user may wish to select. Example categories include digital cameras, running shoes, cold medicines, health insurance plans, automobiles, jobs, prospective partners for dating, travel arrangements, consulting services, and software products. "Attributes" generally refer to features, specifications, or properties that identify and distinguish the items in a category. Attributes may be of various types, including, for example, Boolean (such as whether it has a sunroof), numerical (such as price, weight, or image resolution in pixels), enumerated (such as type of battery), text (such as product name, manufacturer, or warranty details), or other attributes (such as a photographic image of each item). Preferably, the system offers each user a "recommendation list" of items that will exactly or partially meet that user's preferences or requirements based on the user's inputs, optionally ranked by degree of match or by price.

The system can be made available to run stand alone on a personal computer, distributed on a physical medium, such as a floppy disk, or CD-ROM, or distributed electronically over the internet or other computer network, or to run on a server computer, accessed by the internet, an intranet, an extranet or other computer network, via a web browser or other client software running on a personal computer, personal digital assistant, or other computer device. Preferably, the system also may interact with each user via voice, using a telephone or other device, that provides questions and advice to the user via recorded or synthetically generated voice, and receives spoken input from the user, including responses to questions or unprompted speech. The recommendation list of alternatives refers to a list of alternatives based on the system's or software's rating or scoring of alternatives and/or user selections of alternatives to include in the list.

Preferably, the system presents questions to each user or accepts unprompted inputs from the user about desired benefits, instead of, or as well as, questions about specific product attributes. "Benefits" generally refer to ways in which the alternative may help (or hinder) the user in achieving his or her personal objectives or values. Specific features or attributes of an item may help or hinder one or more benefits. For example, the benefits of a digital camera might include enabling the user to easily and quickly record pictures of family and friends, and to share those pictures via e-mail. The attributes of automatic focusing and exposure, and rapid downloading from a camera to a computer, all support these benefits. For each answer to a question about benefits, the system specifies or updates the weight of each attribute that supports that benefit and sets requirements for attributes necessary to support that benefit. Questions about benefits are usually easier and more natural for users to answer than questions about attributes or features, which they may find harder to understand.

In a preferred embodiment, the system generates and displays for the user a list of some or all of the common attribute values that are shared by all the items in a recommendation list. These common attributes provide a simpler and more compact presentation of the commonalities among the items than if the corresponding attribute values were displayed separately for each item in a list or table. Additionally, the system might generate and display for the user a personalized subset of the attribute values that are shared by all the alternative items or which are shared by none of the alternatives items in a recommendation list, including only those attributes that have the highest weight for the user. The list of common attributes identifies to the user those ways in which all the items on the list are similar, and offers a simpler and more compact presentation than a list or table that shows the same attribute values separately for each item.

"Weight" generally refers to a numerical weighting for each attribute that estimates the relative importance of that attribute for a user in making a selection. The weight may be based on prior expert judgment of the importance of each attribute for a class of users or on an input from or other information about the user. A high weight is generally assumed for an attribute for which an absolute requirement has been specified, wherein "requirement" refers to a required value or set of values for an attribute to meet the needs or preferences of a user. For example, the required price might be less than $100, or the required battery type might be lithium ion. "Personalized results" generally refers to outputs from the system or system software displayed to a user that are not provided in the same form to all users, but rather are generated in different forms to suit each user or classes of user based on specific information about that user.

Preferably, the system generates a "personalized explanation" for some or all of the items in a recommendation list. The explanation may contain zero or more pros and cons. "Pros" and "cons" are lists of attributes that have different values for different alternatives in the recommendation list. A "pro" identifies each attribute whose values meet user preferences or requirements well. Conversely, a "con" identifies each attribute whose values meet user's preferences poorly or fail to meet a user's requirements. Preferably, the system estimates a numerical "preference value" representing the degree to which each possible attribute value meets or fails to meet the user's requirements or preferences. The system calculates a "relative preference value" for each attribute of an item as the difference between the preference value for that item and the average preference value for all items in the category. It identifies an attribute as a pro if the relative preference value is positive (or above a minimum threshold value). It identifies an attribute as a con if the relative preference value is negative (or below a minimum threshold value). The explanation may also mention other attributes that are of possible relevance to the user but are not identifiable as pros or cons due missing information on the attribute importance or the attribute value. This personalized explanation allows the system to highlight for each user the advantages and disadvantages of each item relative to the others on the list based on the user's expressed preferences.

Preferably, the system generates a personalized explanation for each item included as pros and/or cons only those attributes that have a high decision relevance. "Decision relevance" is a metric representing an estimate of how relevant each attribute value is to the user's decision to select that item. Preferably, the system computes decision relevance as an increasing function. One possible function is the product of the attribute weight and the absolute value of the relative preference value. Preferably, the system includes as pros or cons those attributes with the high decision relevance, and excludes those attributes with low decision relevance because they are unimportant to the user and/or they do not discriminate between the items in the recommendation list. Thus, the system generates explanations that include those attributes of high practical relevance to the user and are simpler and more compact than if they included all of attributes or all those whose values that differed among the items.

Pros of an alternative generally refers to a list of one or more attributes on which an alternative value meets user preferences better than some or most other alternatives meet user preferences. Conversely, cons of an alternative generally refers to a list of one or more attributes on which the alternative has a value that meets user preferences worse than some or most other alternatives.

The system can generate, for selected pros and cons, a reference to the user's directly expressed preferences or requirements for each attribute value—for example, "Pro: Price of $200, below your maximum price of $300", or "Con: It has no DVD drive, which you requested." It also generates, for selected pros and cons, a reference to the fact that the attribute has a value that the system recommends, or does not recommend, based on indirect inferences by the system from user inputs—for example, "Pro: A powerful zoom lens, which I recommend for sports photography" or, "Con: No zoom lens, which I recommend for sports photography" where the user had explicitly identified an interest in sports photography. These methods provide to the user a justification of how the pros and cons relate to the user's expressed preferences and requirements, and a direct confirmation for the user that the system is using information provided by the user in generating its recommendations.

Generally, the system presents questions to each user about their preferences for benefits that the alternative provides, instead of, or as well as, questions about specific product features or attributes. Benefits generally refers to ways in which using or having the alternative may help (or fail to help) the user further his or her personal objectives or values. Specific features or attributes of an alternative may help or hinder one or more benefits. For example, the benefits of a digital camera might include enabling the user to easily and quickly record pictures of family and friends, and to share those pictures via the web or e-mail.

Preferably, the system dynamically prioritizes the questions to ask the user during interaction with the user, based on information from the user so far. It assigns higher priority based on the expected value of the questions in terms of the probability of the effects of possible answers on the scores of the most recommended items, The expected value of the question depends on the possible effect the answer on the relative scores of the items. It is a function of the current uncertainty about the importance of the attribute(s) to which the questions is relevant and the variability of the attribute values among the items. Preferably, the system does not require the user to answer all questions. This saves the time and effort of the user by asking those questions first that are most likely to influence the relative score of the items, and will give better results even if the user answers only a few of the possible questions.

Preferably, the system estimates the priority of each question as the sum of the products of the expected importance of each attribute to which the question pertains, the uncertainty (for example, variance) of the importance, and the variability (for example, variance) of the corresponding attribute values among the promising items.

In a preferred embodiment, if no item meets all specified requirements, the system displays a conflict page that lists the attribute requirements identified as most responsible for eliminating items. This allows the user to select requirements to revise and relax to avoid eliminating all the items. Preferably, the conflict page provides the user the option to select one or more attribute requirements to revise and relax. This makes it quick and easy for the user to select requirements to revise and relax. The conflict page preferably dynamically displays the number of items that would meet all requirements if the user were to relax the select requirements. This makes it easy for the user to see how many, if any, items will meet the set of revisions to the requirements.

As an example, if a user wished to purchase a new pair of running shoes, the system would provide a series of questions pertaining to desired benefits and attributes of running shoes. For example, the system may ask about the user's running style, importance of cushioning, likely use on track, road, or trails, average weekly mileage, whether to be used for training or racing, and the desired price range. The questions can be absolute (e.g., the shoe must be waterproof, or it should cost between $60 and $80) or relative (e.g., a lighter shoe is preferable). Based upon answers provided by the user, the system weights the attributes and computes preference values for each attribute and an overall score as the weighted sum of the preference values. It generates a list of running shoes that best meets the requirements of the user. Preferably, it provides a list of the important common attributes, pros or cons, shared by all products on the list. For each product, it provides an explanation of the recommendation listing the pros and cons of greatest decision relevance. The system may identify pros and cons as such by labeling them explicitly as "Pros: . . . " and "Cons: . . . ", by other text ("the shoe has these advantages: . . . " and "but be aware before purchasing the shoe that . . . "), or by symbols, such as green check marks for pros and red X marks for cons.

Although the invention has been described with reference to specific exemplary embodiments, it will be appreciated that it is intended to cover all modifications and equivalents within the scope of the appended claims.

What is claimed is:

1. A computer-implemented method for assisting a user in determining one or more items from an item set, the method comprising:
   outputting one or more questions about a user's preferences;
   receiving answers for the one or more questions related to the user's preferences;
   for each answer to a question in the one or more questions, performing the steps of:
      determining one or more attributes that are associated with the question; and
      updating or specifying a relative importance value for the one or more attributes based on the answer to the question, wherein a relative importance value is updated for an attribute when the attribute was associated with a prior question and specified when the attribute was not associated with a prior question;
   generating at least one list of items selected from the item set based on the relative importance values for the one or more attributes determined for the answers for the one or more questions; and
   outputting the at least one list of items.

2. The method of claim 1, further comprising determining at least one pro and at least one con for an attribute, the at least one pro and at least one con identifying how well the attribute meets the user's preferences.

3. The method of claim 2, further comprising generating a statement that includes a recommendation based on the determined at least one pro and the at least one con.

4. The method of claim 1, wherein outputting the one or more questions comprises outputting a series of questions, wherein questions are dynamically determined based on prior answers to prior questions.

5. The method of claim 4, wherein the dynamically determined questions are determined based on their likely affect on the relative importance values for the one or more attributes.

6. A computer-implemented method for assisting a user in selecting one or more items from an item set that best match a set of target preferences, the method comprising:
   obtaining information from the user about that user's set of target preferences, using direct questions;
   associating the set of target preferences with one or more attributes; determining one or more relative importance values for the one or more attributes based on the obtained information;
   estimating decision relevance of an attribute to the user as an increasing function of estimated importance of the attribute to the user and an absolute relative preference value, wherein the absolute relative preference value of a given item is a measure of a difference between an attribute value for the given item and an average value of the attribute for items in the list of items other than the given item;
   generating at least one list of items selected from the item set that will best meet the set of target preferences based on the one or more relative importance values for the one or more attributes; and
   generating a display including the list of items and explanations for at least one item on the list of items explaining how well one or more attributes of the at least one item match the set of target preferences.

7. The method of claim 1, wherein the item is a product, service or other selectable element.

8. The method of claim 1, wherein the information obtained from questions to the user is supplemented with other information about the user.

9. The method of claim 8, wherein the other information includes one or more of information provided by the user during online interactions and information provided by the user during offline interactions.

10. The method of claim 9, wherein the information provided by the user is one or more of registration information, information about prior selections, information about prior purchases and information about prior interactions with automated decision advisors.

11. The method of claim 1, further comprising a step of providing the user with explanations of recommendations, where each explanation contains at least one pro or at least one con, and the explanation refers to an attribute of the item and identifies how well the attribute meets the user's set of target preferences.

12. The method of claim 11, wherein one or more pro or con includes a reference to the set of target preferences.

13. The method of claim 11, further comprising generating a statement relating one or more pro or con to a matching of an attribute and a recommendation for or against an item based on indirect inferences from user inputs.

14. The method of claim 13, wherein each explanation includes those pros and cons that have high estimated decision relevance to the user, and excludes at least one mention of a low estimated relevance attribute.

15. The method of claim 1, further comprising generating for display to the user a list of common attributes for which all of the items on the list of items have common values.

16. The method of claim 15, wherein the list of common attributes includes attributes that have values in a common range.

17. The method of claim 15, wherein the list of common attributes includes pros and cons for attributes that have high estimated importance to the user and excludes at least one pro or con for at least one attribute that has a low estimated importance to the user.

18. The method of claim 17, wherein one or more pro or con includes a reference to the set of target preferences.

19. The method of claim 15, further comprising generating a statement relating one or more pro or con to a matching of an attribute and a recommendation for or against an item based on indirect inferences from user inputs.

20. The method of claim 1, further comprising offering questions to the user in a sequence that is determined dynamically based on answers to previous questions.

21. The method of claim 20, wherein sequence of questions, is based on a priority calculated as an increasing function of the uncertainty about the importance of the attributes to which the question pertains and the variation in attribute relative importance values among the items.

22. The method of claim 21, wherein the variation of attribute relative importance value among the items is weighted to the values of the items with the high current ranking so that the question priority reflects the expectation that answers to the question are likely to change the ranking of the top ranked items.

23. The method of claim 22, wherein the system mentions for each unmet requirements and selected combinations or requirements the number of items it or they eliminate as unacceptable.

24. The method of claim 1, wherein if no item meets all requirements specified by the user, the system displays a conflict page that mentions the fact that no items meet all requirements and lists the requirements that cannot be simultaneously met.

25. The method of claim 1, wherein if no item meets all requirements specified by the user, the system determines a best match based on the one or more relative importance values for the one or more attributes.

* * * * *